No. 894,426. PATENTED JULY 28, 1908.
D. E. DOLSON & E. R. PEASE.
CLUTCH.
APPLICATION FILED NOV. 25, 1907.
2 SHEETS—SHEET 2.
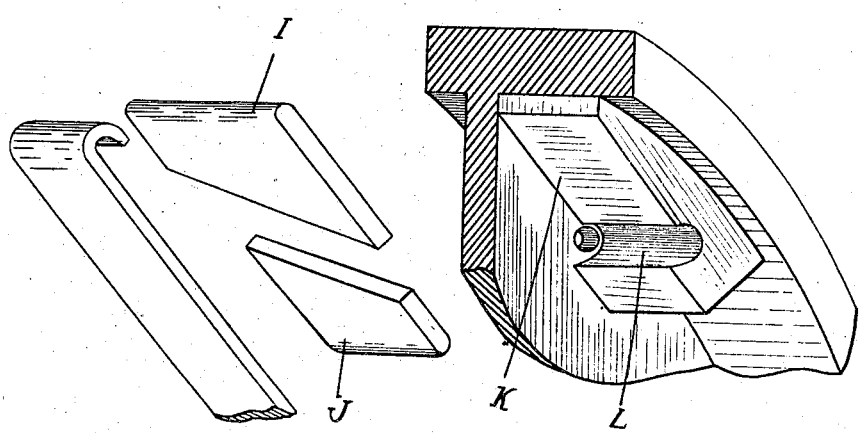
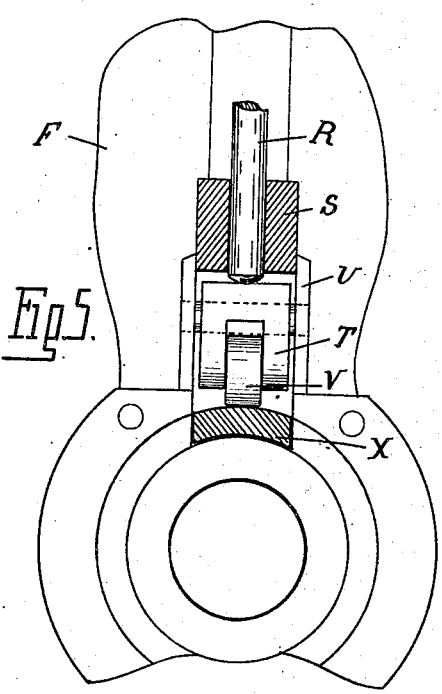
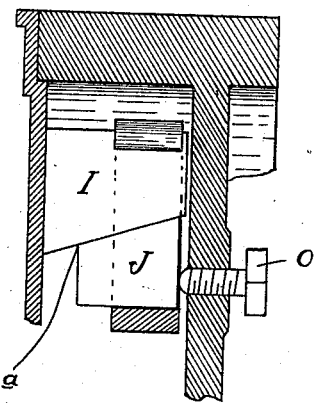
Witnesses
Inventors:
David E. Dolson & Elbert R. Pease

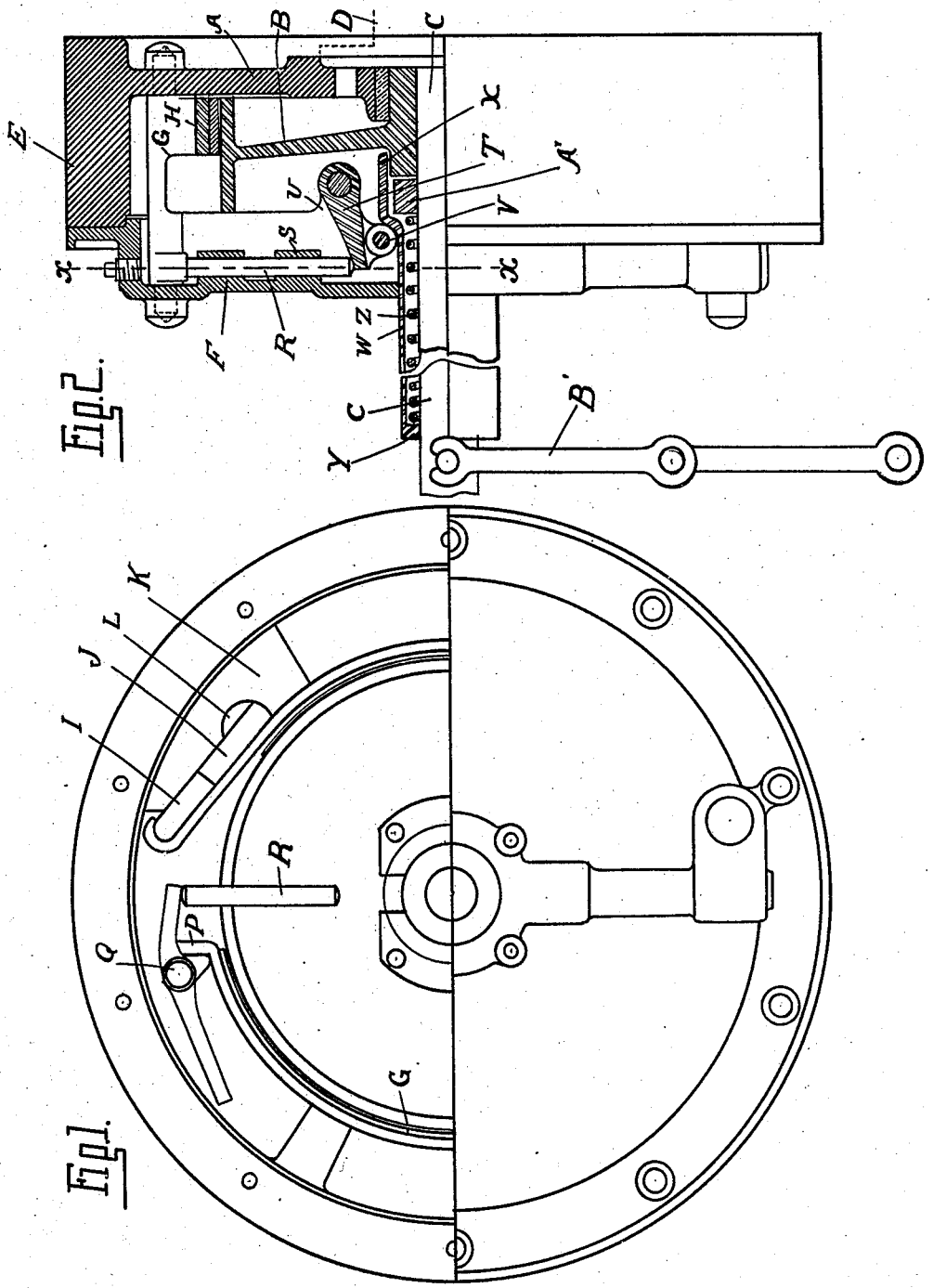

UNITED STATES PATENT OFFICE.

DAVID ELMORE DOLSON AND ELBERT ROSE PEASE, OF CHARLOTTE, MICHIGAN.

CLUTCH.

No. 894,426.　　　　Specification of Letters Patent.　　　Patented July 28, 1908.

Application filed November 25, 1907. Serial No. 403,697.

*To all whom it may concern:*

Be it known that we, DAVID ELMORE DOLSON and ELBERT ROSE PEASE, citizens of the United States of America, residing at Charlotte, in the county of Eaton and State of Michigan, have invented certain new and useful Improvements in Clutches, of which the following is a specification, reference being had therein to the accompanying drawings.

The invention relates particularly to a band friction clutch, and consists in the novel and simple construction thereof and in the peculiar arrangement and combination of the parts, as will be more fully hereinafter set forth.

In the drawings,—Figure 1 is a view in front elevation of our improved clutch mechanism, with the facing or cover removed to show the interior construction; Fig. 2 is a vertical central section through the clutch; Fig. 3 is a sectional perspective view, with parts detached, illustrating the construction of the adjusting means for the friction bands; Fig. 4 is a detail view further illustrating the adjusting mechanism and the manner of its operation; and Fig. 5 is a section taken on line $x$—$x$ of Fig. 2, showing some of the parts in elevation.

Our improved clutch is intended for use on various kinds of machinery where two shafts are to be coupled together, but for the purpose of illustrating the invention we have shown the clutch as forming the coupling between the usual transmission shaft of an automobile and the engine shaft.

The reference-letters A and B represent two rotatable members respectively loose and fixed upon the shaft C. The member A is shown as the usual fly-wheel of an engine fixedly secured to the engine shaft D, while the member B is a friction drum keyed upon the transmission shaft C, the fly-wheel being loosely sleeved upon the hub of the drum to economize space.

The member A is provided with the usual flange or rim E, and with a facing F bolted or otherwise secured to the rim, forming in connection with the fly-wheel a casing in which is housed the friction drum and the clutch mechanism to be hereinafter described.

G and H represent complementary friction bands encircling the drum, each having one end free and its opposite end secured to the loose member A. Each band extends practically entirely about the drum so as to form a maximum amount of friction surface, and the free ends of the bands are oppositely disposed so that when clamped about the drum the frictional engagement will be balanced.

The fixed ends of the bands are preferably adjustably connected to the member A, so that they can be lengthened or shortened as desired to properly clamp the drum. The adjusting mechanism consists of complementary wedge sections or members I and J formed with adjoining inclined sides $a$. The member I is arranged with its face against the bearing-block K upon the periphery of the fly-wheel and the wedge J, with its straight edge bearing against the abutment L forming a part of the block described. The fixed end of the band is provided with a hook-shaped extension M that engages about the wedge I in the manner indicated in Figs. 3 and 4, forming a yielding or movable abutment for the member I. O represents a set-screw extending through the web of the fly-wheel and bearing against the wedge J, the parts being so arranged and proportioned so that as the set-screw is driven inwardly the wedge J will be depressed, causing the band to contract, thus tightening the band proper about the drum.

The free end of each band terminates in an upright portion P forming a vertical bearing, and associated with each of these bearings is a bell-crank lever Q pivoted in bearings in the fly-wheel and facing F and bearing against the upright described and a radially movable bar or rod R, so that as the rod is moved outwardly from the hub of the wheel as hereinafter set forth a pull will be exerted upon the band through the agency of the rock lever in a direction to clamp the band about the drum, thus effecting the frictional engagement desired.

Two pins or rods, as R, are employed,—one for each band end,—and these devices are mounted in bearings S upon the interior of the facing F for vertical reciprocation. Beneath each rod is located a member T pivoted between ears U upon the facing and carrying a roller V adapted to bear normally against an axially-shiftable sleeve W upon the shaft.

The sleeve described extends within the housing, terminating in oppositely disposed pronged sections X, forming a cam for operating the member T, while the opposite end projects at some distance beyond the housing and is provided with an annular flange Y engaging the shaft C. Interposed intermediate the sleeve referred to and the shaft C is a spiral spring Z abutting at one end against the flange Y and at its opposite end against an abutment A' secured to the facing F, as plainly shown in Fig. 5. The spring serves to move the sleeve E outward on the shaft C, bringing the cam in engagement with the pivoted member T, thus effecting a clamping engagement between the friction bands and the drum. The sleeve and cam may be shifted to an inoperative position as indicated in Fig. 2 wherein the cam is out of engagement with the pivoted member and the drum free to rotate independently of the fly-wheel. This shifting may be effected by any suitable mechanism, as for instance a pivoted lever B', and a ring or other suitable device, as C' engaging a groove formed in the exterior of the sleeve for that purpose.

The operation of the clutch will be obvious from its construction, the bands being normally clamped about the drum by the spring and the braking engagement broken by the shifting of the sleeve.

It will be noticed from the construction set forth that by providing a facing for the fly-wheel or other rotary member employed a housing is formed for the working parts which may contain a suitable lubricant, the facing being designed to fit tightly about the sleeve and the latter about the shaft, so as to form tight joints. Furthermore, by supporting the abutment that receives the thrust of the spring on the movable member,—in this instance the facing F,—the moving parts are released from a strain or friction that would otherwise result from the tension of the spring.

What we claim as our invention is,—

1. In a clutch, the combination with a shaft, of a rotary member loosely sleeved thereon, a friction drum fixed upon the shaft, a friction band encircling the drum having one end free and the other fixed to the rotary member, a sleeve upon the shaft, a cam associated with the sleeve, a pivoted member in operative relation to the cam, a radially movable member carried by the rotary member extending in operative relation to the pivoted member, and a bell crank lever forming an operative connection between the radially movable member and the free end of the friction band.

2. In a friction clutch, the combination with a single shaft, of a drum fixed thereon, a rotary member loose upon the shaft provided with a flange or rim encircling the drum, a facing or covering for the flanged member forming in connection with the latter a housing inclosing the drum, a friction band extending about the drum having one end secured to the rotary member and the other end free, a radially movable actuating member upon the facing operatively associated with the free end of the band, and means for operating said member radially to clamp the band to the drum.

3. In a friction clutch, the combination with a shaft, of a rotary member loosely sleeved upon the shaft, a friction drum fixed upon the shaft, a friction band encircling the drum having one end free and the other fixed to the rotary member, an operating cam, a band-actuating member operatively associated with the cam, a single bell crank lever forming a direct operative connection between said band actuating member and the band end, and means for operating the cam.

4. In a friction clutch, the combination with a shaft, of two rotatable members fixed and loose upon the shaft, complementary friction bands encircling the fixed member, each band being secured at one end to the loose member extending entirely about the fixed member and having its opposite end free, and the free ends of the bands being oppositely disposed, two radially-movable bars or rods positioned upon opposite sides of the shaft, operative connections between said rods and the free ends of the bands, and means for simultaneously operating the rods or bars to effect a frictional engagement between the bands and the fixed member.

5. In a clutch, the combination with a shaft, of two rotatable members respectively fixed and loose thereon, a friction band extending about the fixed member having one end free and the other secured to the loose member, a radially-movable member operatively associated with the free end of the band, a sleeve upon the shaft, a spring housed within said sleeve, said members forming a spring-pressed cam for actuating said radially movable member, and means for operating the cam.

6. In a friction clutch, the combination with a shaft, of a drum fixed thereon, a rotary member loose upon the shaft provided with a flange or rim encircling the drum, a facing or covering for the flanged member forming in connection with the latter a housing inclosing the drum, a friction band extending about the fixed member having one end free and the other secured to the loose member, a radially movable member operatively associated with the free end of the band, a spring pressed cam for actuating said member extending within the housing, means for operating the cam, and an abutment carried by said loosely mounted member for receiving the thrust of the cam spring.

7. In a clutch, the combination with a shaft, of a rotary member loosely sleeved thereon, a drum fixed upon the shaft, a friction band encircling the drum having one end free, and means for adjustably connecting the opposite end to the rotary member, comprising complementary wedge members, a connection between one of said members and the band, a bearing or backing for the complementary member, and means for effecting a relative adjustment between the members.

8. In a friction clutch, the combination with a shaft, of a drum fixed thereon, a rotary member loose upon the shaft provided with a flange or rim encircling the drum, a friction band extending about the fixed member having one end free, a bearing on the inner side of said flange for the other end of the band, means for adjusting the end of said band in relation to said bearing, a radially movable member, means for actuating said member, and connections between said last mentioned member and the free end of the band for clamping the latter to the fixed member upon the operation of the actuating means.

In testimony whereof we affix our signatures in presence of two witnesses.

DAVID ELMORE DOLSON.
ELBERT ROSE PEASE.

Witnesses:
L. F. GREENE,
B. FALLS.